United States Patent [19]
Weber

[11] 4,062,421
[45] Dec. 13, 1977

[54] BICYCLE DRIVE SYSTEM

[76] Inventor: Milton N. Weber, 20655 Audette, Dearborn, Mich. 48124

[21] Appl. No.: 661,384

[22] Filed: Feb. 25, 1976

[51] Int. Cl.$^2$ ............................................. B60K 1/00
[52] U.S. Cl. .......................... 180/65 A; 180/33 C; 200/61.89; 280/214; 310/14; 318/135
[58] Field of Search ............... 180/33 C, 33 D, 33 E, 180/34, 65 R, 65 A, 65 F; 280/212, 214, 215; 310/14, 12, 168, 169, 170, 233; 318/135; 200/61.89; 104/148 LM

[56] References Cited
U.S. PATENT DOCUMENTS

| | | | |
|---|---|---|---|
| 552,312 | 12/1895 | Battey | 180/33 C |
| 2,179,418 | 11/1939 | McDonald | 180/34 X |
| 2,794,929 | 6/1957 | Adamski | 310/12 |
| 3,441,819 | 4/1969 | Palmero | 310/12 X |
| 3,533,484 | 10/1970 | Wood | 180/65 R |
| 3,548,965 | 12/1970 | Pierro | 180/65 F |
| 3,555,380 | 1/1971 | Hings | 104/148 LM X |
| 3,884,317 | 5/1975 | Kinzel | 180/34 |
| 3,939,932 | 2/1976 | Rosen | 180/33 C |

FOREIGN PATENT DOCUMENTS 865,048  5/1941  France .................... 180/33 D

*Primary Examiner*—Joseph F. Peters, Jr.
*Assistant Examiner*—John P. Silverstrim
*Attorney, Agent, or Firm*—Cullen, Settle, Sloman & Cantor

[57] ABSTRACT

A power drive system to augment pedalling of a bicycle including a reversible magnetically balanced electromagnetic field positioned in proximity to one wheel of the bicycle, at least one permanent magnet mounted on the wheel to pass through the electromagnetic field when the wheels are rotated by conventional pedalling, and a reversing switch responsive to the position of the permanent magnet to alternate the polarity of the electromagnetic field thereby alternately attracting the permanent magnet into the electromagnetic field and thereafter repelling the permanent magnet outwardly from the electromagnetic field. A reed type switch is positioned to respond to the movement of the permanent magnet to reverse the polarity of the electromagnetic field. A proximity switch is triggered by conventional pedalling to turn off the power when pedalling ceases. Thus, the power drive system assists in the pedalling but does not provide power when the cyclist is coasting.

6 Claims, 8 Drawing Figures

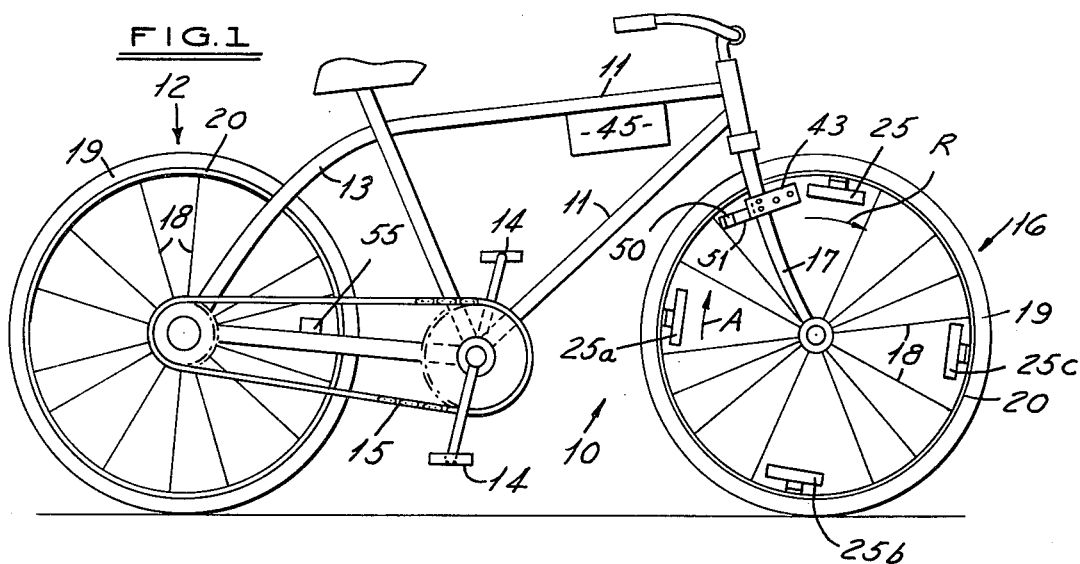
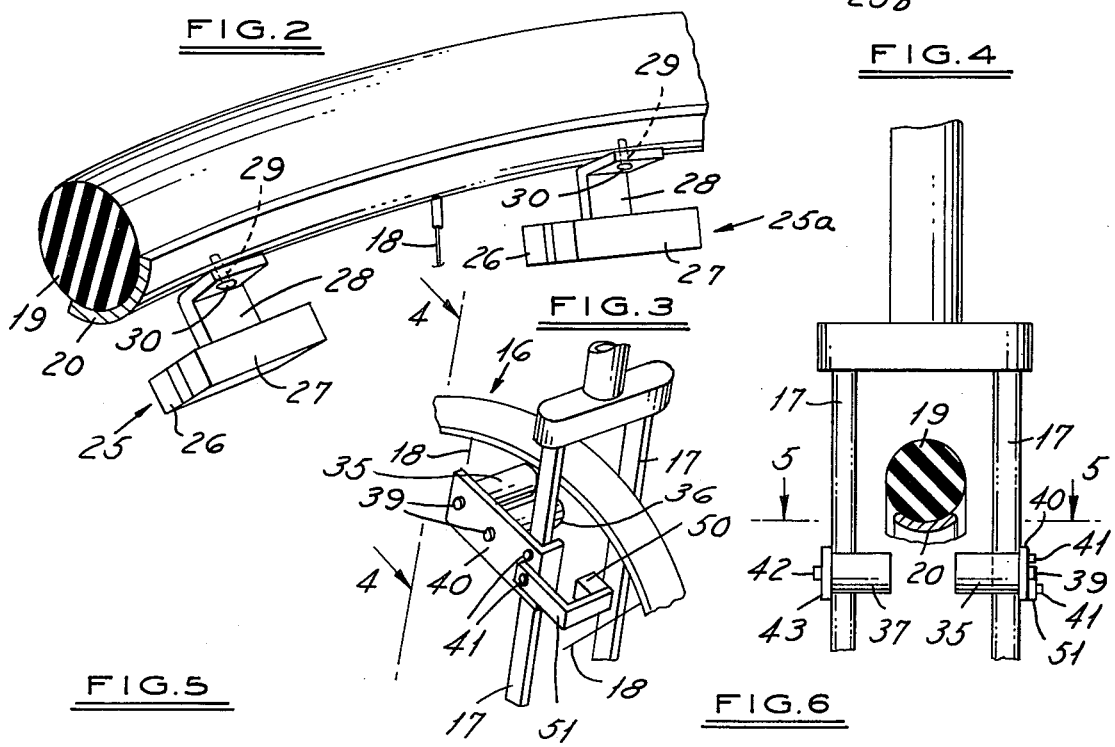
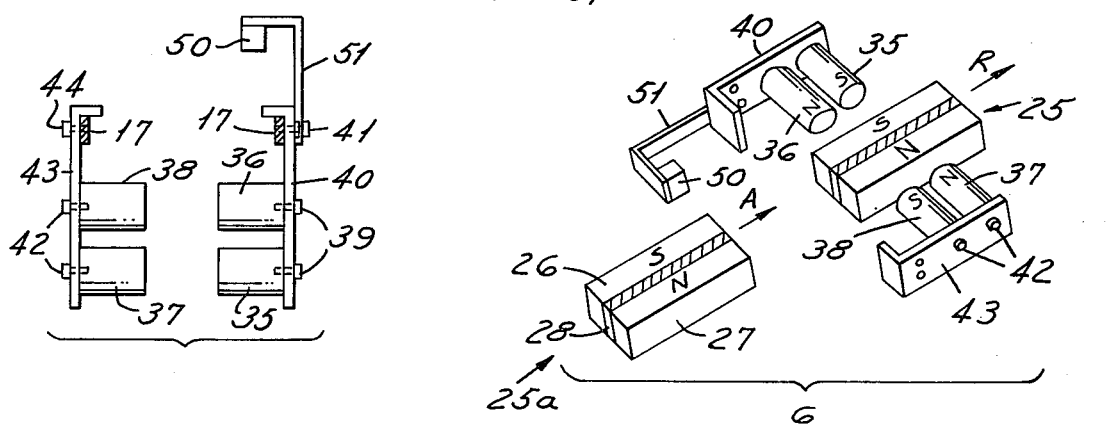

BICYCLE DRIVE SYSTEM

BACKGROUND OF THE INVENTION

The invention herein relates to a bicycle drive system to augment the normal pedalling of a bicycle. As such, it is different in principle and in function from ordinary motors which are frequently attached to bicycles.

Many people ride bicycles as a means of physical exercise. However, pedalling long distances and pedalling up inclines can become quite fatiguing. Thus, there is clearly a need for a power assist to be used in conjunction with bicycles.

While motorized bicycles are, of course, common, they interfere with the normal operation of the bicycle. That is, with the use of a motor the cyclist can no longer use the pedals to control the speed of the bicycle. Obviously, the use of a motor defeats the value of cycling for exercise. Furthermore, while multi-speed bicycles are also common, their use still results in significant exertion and fatigue when pedalling up long inclines.

Thus, there is a need for a power drive system for bicycles which permits the cyclist to obtain maximum exercise from the bicycle without the accompanying tedious exertion and which also permits the cyclist to retain full control over the bicycle by use of the pedals.

Thus, the invention herein relates to a relative inexpensive power drive system to augment bicycle pedalling which can be utilized on all bicycles.

SUMMARY OF THE INVENTION

The invention herein relates to a power drive system to augment bicycle pedalling including a reversible magnetically balanced electromagnetic field positioned in proximity to one wheel of the bicycle and a plurality of permanent magnets mounted on the wheel to sequentially pass through the electromagnetic field when the wheels are rotated by conventional pedalling. The system includes a reversing switch responsive to the position of the permanent magnets to alternate the polarity of the electromagnetic field and thereby alternately attract each permanent magnet, in turn, into the center of the electromagnetic field and thereafter repel each permanent magnet outwardly from the electromagnetic field. The alternating forces of attraction and repulsion function to assist the cyclist by increasing the power generated by the pedalling without increasing the exertion necessary to propel the bicycle and without increasing the speed of the bicycle to make the speed unsatisfactory for exercise purposes.

The electromagnetic field is operated on the solenoid principle and a reed type switch responds to the position of each permanent magnet to reverse the polarity of the electromagnetic field when each magnet, in turn, first enters the electromagnetic field and when each magnet reaches the center of the electromagnetic field.

In a preferred embodiment a balanced electromagnetic field is provided with no air gap except in the region where the permanent magnets pass. Thus all the working flux is utilized to attract and repel the permanent magnets.

A proximity switch is triggered by movement of the pedals to turn off the electromagnetic field when the cyclist is not pedalling. Thus, during periods of coasting, the power drive system does not propel the bicycle forward.

BRIEF DESCRIPTION OF THE DRAWINGS

The various objects and advantages of the present invention will become apparent upon reading the following description taken in conjunction with the drawings.

In the drawings, wherein like reference numerals identify corresponding components;

FIG. 1 is an illustration of a bicycle showing the physical location of the electromagnets, the permanent magnets and the remaining components of the present invention;

FIG. 2 is an enlarged partial perspective illustration of the mounting of the permanent magnets to the bicycle;

FIG. 3 is a partial perspective illustration of the mounting of the electromagnets to the bicycle;

FIG. 4 is a partial front elevation view of the mounting of the electromagnets to the bicycle as seen in the plane of arrows 4—4 of FIG. 3;

FIG. 5 is a partial top plan view as seen in the plane of arrows 5—5 of FIG. 4;

FIG. 6 is a perspective schematic illustration of the spatial orientation of the electromagnets and permanent magnets of the present invention;

DETAILED DESCRIPTION

Figure 7:
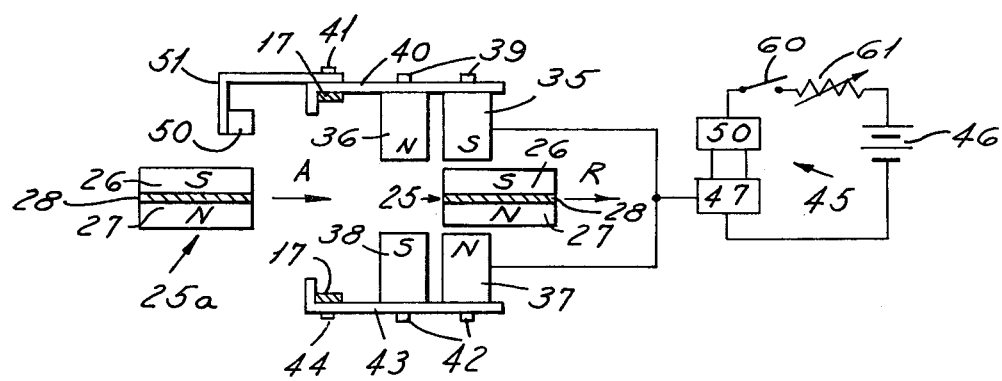
FIG. 7 is a combined diagrammatic and circuit illustration of the present invention.

As shown in the drawings, the power drive system of the present invention may be attached to any bicycle 10 whether it be a one speed, three speed or five or more speed bicycle. The bicycle is conventional including a frame 11, a rear wheel 12 mounted to rotate in a rear fork 13 and the pedals 14 which drive the rear wheel through a chain 15. The bicycle includes a front wheel 16 mounted in a front fork 17, and each of the wheels is illustrated as having spokes 18 and a tire 19 mounted on a rim 20.

According to the principles of the present invention, at least one permanent magnet is provided which moves through a reversible electromagnetic field. Preferably, four permanent magnets 25, 25a, 25b, 25c, equally spaced apart, are mounted on the front wheel although the principles of the present invention may be used with one or more permanent magnets. Each permanent magnet 25 is actually two separate ceramic magnets 26, 27, adhesively secured to opposite sides of one leg of an L-shaped mounting bracket 28, and magnetized after assembly.

The mounting bracket is made of steel or other non-magnetic material and the free leg is apertured as at 29. A fastener such as a screw 30 inserted through the aperture 29 secures the bracket to the metal rim 20 of the wheel 16. Each magnet 26, 27, for example, may have a thickness of 0.25 inches, a height of 0.5 inches and a length of 1.50 inches.

In order to establish the desired electromagnetic fields to alternately attract and repel the permanent magnets, it is preferred to provide a completely balanced electromagnetic assembly. Thus the permanent magnets pass through all the working flux. To this end, four coils 35, 36, 37 and 38 are provided with each coil including a ferrous core or series of laminations as is conventional.

Cores 35 and 36 are mounted in a side by side relationship by bolts 39 to a ferrous plate 40. Plate 40 is generally L-shaped and mounted by bolts 41 to one side of the front fork 17. Cores 37 and 38 are mounted in a side by side relationship by bolts 42 to a second L-shaped ferrous plate 43 which, in turn, is mounted by bolts 44 to the opposite side of the front fork 17. An air gap is defined between the ends of the coils which are not mounted on the ferrous plates and the permanent magnets (and the wheel spokes) pass through this air gap.

Since the coils alone do not establish an electromagnetic field, it is necessary, as is well known, to provide electrical current to the coils to establish the desired fields. An electrical circuit 45 is provided including a source of power such as a 12 volt battery 46. Furthermore, since it is desired to reverse the polarity of the fields, a reversing switch 47 is included in the circuit. The circuit may be mounted to the cycle frame 11.

Before describing the remainder of the circuit, the structure for actuating or triggering the reversal of polarity of the coils will be explained. As the wheel is rotated in a clockwise direction, a first permanent magnet 25a is being attracted in a clockwise direction into the electromagnetic field, (arrow "A", FIG. 1) while the prior magnet 25 is being repelled in a clockwise direction from the electromagnetic field. (Arrow "R", FIG. 1).

In order to first attract and then repel each magnet 25, then as each magnet 25 enters the center of the electromagnetic field, i.e., the area between the coils, it is necessary to reverse the polarity of current to the coils and, thus, reverse the polarity of the electromagnetic field. To accomplish this objective, it is desirable to sense the physical position of each magnet relative to the coils as the magnet moves into the electromagnetic field, and for this purpose, a reed type switch 50 is secured to an L-shaped mounting bracket 51 which, in turn, is secured by one of the bolts 41 to the plate 40 and the fork 17. The reed type switch 50 is spaced away from the coils a sufficient distance so that when the moving magnet 25 reaches the center of the electromagnetic field, (i.e., the center of the air gap) the trailing end of the magnet actuates the reed switch. At this distance, the leading edge of the next magnet 25a will actuate reed switch 50 to again reverse polarity as the first magnet leaves the electromagnetic field and the next magnet enters the electromagnetic field.

Since one purpose of the present invention is to augment or supplement pedalling, means are provided to turn off the electrical circuit 45 when the cyclist is coasting. Specifically, a conventional proximity switch 55 is mounted on the frame 11 adjacent the rear wheel. The proximity switch, as is conventional, has a magnetic field which is distorted or disturbed by the pedal passing therethrough to signify that pedalling is taking place.

Turning now to the circuit 45, a main on/off switch 60 is provided so that the cyclist may ride the bicycle without using the present invention, such as on flat terrain or when maximum exercise is desired. In addition, a voltage adjustment or potentiometer 61 is provided in the circuit so that the cyclist may adjust the intensity of the electromagnetic field.

The electrical power is provided from battery 46 through the polarity reversing switch 47 and through voltage adjustment potentiometer 61 to the four coils 35, 36, 37, 38. In a preferred embodiment, coils 35 and 36 on one side of the wheel 16 are connected in series, with the polarity of the coils reversed, and coils 37 and 38 on the other side of the wheel are also connected in series with the polarity of the coils reversed. In addition, the two coils on one side of the wheel are electrically connected in parallel to the other two coils. Optionally, based upon the desired power, all the coils may be in series or in parallel. The important factor is that when coil 35 hs one polarity at the air gap through which the permanent magnets pass, coil 38 should have the same polarity and both coils 36 and 37 should have a polarity opposite to that of coil 35. In addition, the ferrous plate 40 provides a flux path from coil 35 to coil 36 and ferrous plate 43 provides a flux path from coil 37 to coil 38. Thus coils 35 and 36, together with plate 40, function as a horseshoe electromagnet as do coils 37 and 38 with their plate 43.

Figure 8:
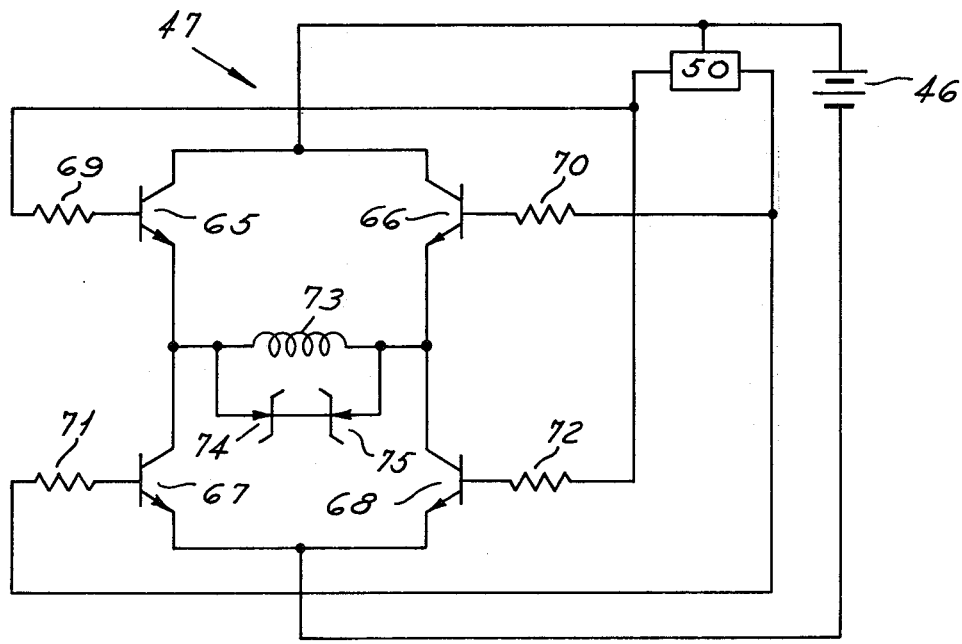
FIG. 8 is a circuit diagram of the electronic polarity reversing switch of the present invention.

The reversal of polarity to the coils 35, 36, 37 and 38 is controlled by the polarity reversing switch 47 which may be a conventional double pole double throw switch actuated by the reed type switch 50. However, for faster switching, an electronic reversing switch is preferred as illustrated in FIG. 8.

The electronic reversing switch includes four transistors 65, 66, 67 and 68 each having its base connected through a resistor 69, 70, 71, 71, respectively, to the reed type switch 50.

Transistors 65 and 66 have their collectors tied together and to the positive terminal of battery 46 and transistors 67 and 68 have their emitters tied together and to the negative terminal of battery 46. The load 73 is coupled, on one side, to the junction of the emitter of transistor 66 and the collector of transistor 68 and the other side of the load is connected to the junction of the emitter of transistor 65 and the collector of transistor 67. The transistors operate as switches, i.e., they are either ON or OFF, depending on the presence or absence of base current, respectively.

When switch 50 moves in a first direction transistors 66 and 67 are ON, transistors 65 and 68 are OFF and the right side of load 73 is positive. When switch 50 moves in the other direction, to reverse polarity, transistors 66 and 67 are OFF, transistors 65 and 68 are ON, and the left side of load 73 is positive. Load 73 represents the totality of the four coils 35, 36, 37 and 38. A pair of back-to-back connected zener diodes 74, 75 are connected across the load to limit any back EMF in the load (coils) to the zener diode breakdown voltage.

The polarity of the coils and magnet is illustrated in FIGS. 6 and 7 at the time the leading edge of the magnet 25a has energized reed type switch 50. Thus, the magnet 25a is being attracted into the electromagnetic field as indicated by arrow "A". The previous magnet 25 is thus being repelled as indicated by arrow "R".

By this technique of alternately attracting and repelling the permanent magnets, maximum utilization of the electromagnetic field strength to propel the bicycle is obtained.

The operation of the system will now be summarized. When the on/off switch 60 is closed to permit power from the battery to energize the coils, the response of the reed type switch 50 to the leading edge of a magnet 25 sets the polarity reversing switch 47 to establish the electromagnetic field in a first direction to attract the magnet 25. As the cyclist continues to pedal, the magnet is pulled into the electromagnetic field by the forces of attraction until the trailing edge of the magnet 25 reaches the switch 50 which is the same time that the leasing edge of the magnet reaches the center of the electromagnetic field. At this time, the switching of the switch 50 reverses switch 47, to reverse the polarity of the coils. This reverses the polarity of the electromagnetic field to repel the magnet 25 outwardly of the coils. Then, as the next permanent magnet 25a approaches the reed type switch, its leading edge again reverses the reed type switch and the polarity reversing switch 47 so that the next magnet 25a is attracted by the electromagnetic field.

The foregoing explains the structure and principles of operation of the preferred embodiment of the invention. Various changes and modifications may be made, of couse, without departing from the spirit and scope of the present invention. For example, any suitable electronic or mechanical switch may be used instead of the electronic polarity reversing switch of FIG. 8. Similarly one coil may be used instead of two pairs of coils. Also, multiple sets of coils may be mounted around the wheel rather than two sets mounted at the fork. Furthermore, any desired number of permanent magnets may be mounted on the rim of the bicycle. Finally, the entire system may be mounted on either wheel and, in fact, a system may be mounted on each wheel. Thus, the present invention should be limited only by the scope of the following claims.

What is claimed is:
1. In a power drive system for a vehicle, the vehicle including conventional frame, front wheels and rear wheels, the power drive system comprising:
   a reversible polarity electromagnetic field positioned in proximity to one wheel of the vehicle;
   at least one permanent magnet mounted on said one wheel for rotation therewith, said permanent magnet positioned to move through the electromagnetic field when said one wheel is rotated; and
   reversing switch means responsive to the position of the permanent magnet relative to the electromagnetic field to alternate the polarity of the electromagnetic field when the permanent magnet moves into the center of the electromagnetic field;
   so that upon rotating said one wheel, the permanent magnet actuates the reversing switch means to repeatedly alternate the polarity of the electromagnetic field to alternately attract the permanent magnet into the center of the electromagnetic field and thereafter repel the permanent magnet outwardly from the electromagnetic field to assist in the rotation of the wheel, said vehicle including pedals to rotate said wheels, and further including a proximity switch actuated by each rotation of the pedals for turning off the electromagnetic field, except when the proximity switch is repeatedly actuated by continuing rotation of the pedals, to turn off the power drive system.

2. The invention as defined in claim 1, wherein said system includes four permanent magnets mounted on said one wheel of said bicycle at the same radius from the center of the rear wheel and 90° apart.

3. The invention as defined in claim 1, wherein the reversing swich means includes a reed type switch magnetically actuated by each permanent magnet.

4. The invention as defined in claim 1, wherein said electromagnetic field includes a plurality of spaced apart coils energizable by a source of power, said coils defining an air gap therebetween through which each permanent magnet passes, and said reversing switch means for reversing the direction of power to said coils to reverse the polarity of the electromagnetic field generated by each coil.

5. The invention as defined in claim 4, wherein said coils are positioned in two spaced apart pairs, the coils in each pair being mounted on a magnetic member and having their polarity reversed relative to the other coil in the pair and relative to the coil on the opposite side of said air gap to define a magnetically balanced system.

6. In a power drive system for a bicycle, the bicycle including conventional frame, front and rear wheels and drive pedal members, the power drive system comprising:
   a reversible polarity magnetically balanced electromagnetic field positioned in proximity to one wheel of the bicycle;
   at least one permanent magnet mounted on said one wheel for rotation therewith, said permanent magnet positioned to move through the electromagnetic field when said one wheel is rotated;
   reversing switch means responsive to the position of the permanent magnet relative to the coils to alternate the polarity of the electromagnetic field;
   so that upon pedalling the bicycle, the wheels are rotated and the permanent magnet actuates the reversing switch means to repeatedly alternate the polarity of the electromagnetic field to alternately attract the permanent magnet into the electromagnetic field and thereafter repel the permanent magnet outwardly from the electromagnetic field to assist in the rotation of the wheels; and
   a proximity switch actuated by each rotation of the pedals for maintaining the electromagnetic field on when the proximity switch is repeatedly actuated by continuing rotation of the pedals and to turn off the power drive system when the bicycle is coasting.

* * * * *